No. 762,473. PATENTED JUNE 14, 1904.
C. A. ELLIS.
HOOF PAD FOR HORSES.
APPLICATION FILED DEC. 5, 1903.
NO MODEL.

WITNESSES.
C. J. Hannigan.
Calvin H. Brown.

INVENTOR.
Charles A. Ellis.
By Geo. H. Remington.
Atty.

No. 762,473.

Patented June 14, 1904.

UNITED STATES PATENT OFFICE.

CHARLES A. ELLIS, OF WARWICK, RHODE ISLAND.

HOOF-PAD FOR HORSES.

SPECIFICATION forming part of Letters Patent No. 762,473, dated June 14, 1904.

Application filed December 5, 1903. Serial No. 183,912. (No model.)

*To all whom it may concern:*

Be it known that I, CHARLES A. ELLIS, a citizen of the United States of America, and a resident of Warwick, in the county of Kent and State of Rhode Island, have invented certain new and useful Improvements in Hoof-Pads for Horses, of which the following is a specification.

My invention relates to improvements in elastic or rubber pads adapted to be secured to a horse's hoof.

The object I have in view is to provide an inexpensive hoof-pad possessing at the same time a greater degree of simplicity and efficiency than pads of this class previously produced. My improved pad also possesses the added practical advantage that it may be easily and quickly attached to or detached from the hoof and shoe at will and this, too, without first adapting the hoof and shoe to receive the pad, the latter when in use being securely held in position, thus preventing its accidental detachment, or, in other words, my improved hoof-pad is capable of being readily attached or applied when the shoe is already fast to the hoof and as readily removed therefrom when desired, neither the shoe nor the hoof being in any way specially adapted or prepared for the retention of the pad.

To that end my invention consists, essentially, of a rubber pad adapted to fill the inner space of the shoe, clips secured to and projecting beyond the peripheral edge of the pad adapted to be inserted between the adjacent surfaces of the hoof and shoe, and having the pad provided with a slit extending from the rear or heel toward the toe, whereby it may be bent or flexed while the pad is being attached or detached, all as hereinafter set forth and claimed.

Figure 3:
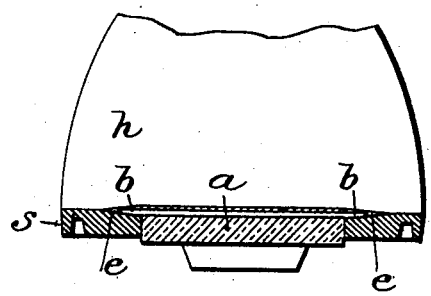
Figure 1:
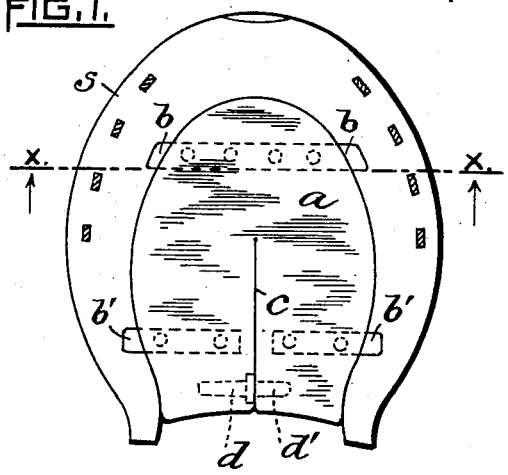
Figure 2:
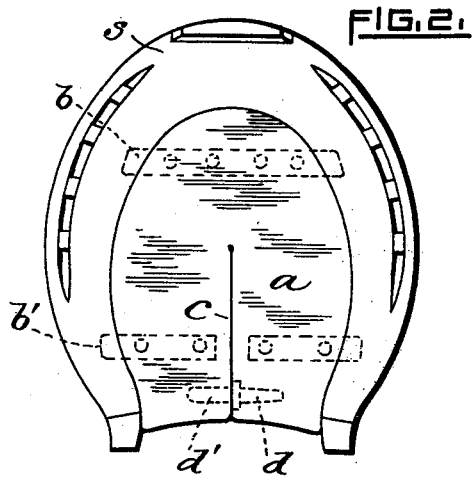
Figure 4:
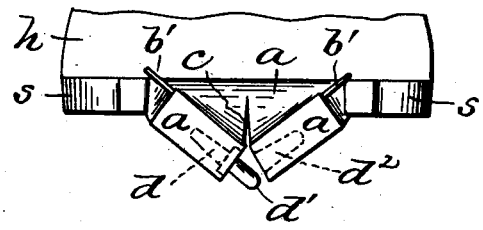

In the accompanying sheet of drawings, Figure 1 is a plan view of a horseshoe of usual construction detached from the hoof, showing my improved hoof-pad in the normal operative position with respect to the shoe. Fig. 2 is a corresponding inverted or bottom plan view. Fig. 3 is a transverse sectional view taken on line $x$ $x$ of Fig. 1; and Fig. 4 is an end elevation showing the rear or heel portion of the pad bent or flexed preparatory to introducing or removing the pad from the shoe, the latter being rigidly secured to the horse's hoof or foot.

I may state before entering into a detailed description of the pad forming the subject of this present application for patent that $h$ in the drawings indicates a portion of the horse's hoof or foot, to which is secured a horseshoe $s$ of usual or ordinary construction. The said shoe may be provided with toe and heel calks, or they may be omitted, since the presence or absence of the calk in no wise affects my present invention.

Horseshoes as usually made are slightly beveled at the top contiguous to its inner edge, thereby when nailed to the hoof $h$ forming a small space $e$ between the adjacent surfaces, as indicated in Fig. 3—that is to say, it is usual to prepare the hoof so that the outer peripheral portion of its lower surface will bear snugly against the upper side or face of the shoe, thus, as just stated, leaving a small open space $e$ around the inner periphery of the shoe.

My improved pad member $a$, of rubber or other suitable elastic or resilient material, is trimmed to conform to the inner shape of the horseshoe and practically fills it, the depth or thickness of the pad being preferably made to exceed that of the shoe, or at least the heel portion of it, so that when in use the frog of the hoof will bear upon the yielding pad and insure that the corresponding portion of the latter will engage the ground slightly in advance of the shoe.

The pad has a slit $c$ cut vertically therethrough and extending from the heel toward the toe or to a point about midway of the pad, as clearly shown. At or near the heel the pad is provided with a transversely-mounted pin or guide $d$, one part being rigidly secured therein, the other part, $d'$, extending across the slit $c$ and into a corresponding hole $d^2$, formed in the pad therefor. This device serves to maintain the two parts of the adjacent or heel portions of the pad in the normal flat or horizontal position.

The pad is provided at or near the top with oppositely-disposed thin metal toe and heel clips $b$ $b'$, respectively. These clips are permanently secured to or molded into the rubber and extend a short distance beyond the edge of the pad and are adapted to enter the said space $e$, formed between the shoe and hoof, Fig. 3, thereby supporting the pad and keeping it in place.

In attaching my improved hoof-pad the operator first bends or depresses its rear or heel portion and inserts the forward or toe part thereof (which is practically flat) upwardly under the frog of the horse's hoof, (the latter being temporarily raised for the purpose.) He then forces the pad endwise, thereby at the same time causing the corresponding clips $b$ to slide into the shallow groove or space $e$. When the pad engages with the point or toe of the shoe, the device will be substantially as represented in Fig. 4, wherein the rear clips $b'$ in temporary engagement with the inner edge of the shoe are adapted to swing down into position coincidently with the act of pressing upwardly to its limit the separated or bent parts of the pad, thereby causing the pin $d'$ to enter the opposite side of the pad, thus completing the operation, the device then appearing as represented in Fig. 1. The pad may be readily detached from the hoof by simply reversing the operation just described.

I am aware that attachable horseshoe-pads of rubber have been produced prior to my present improvement. Therefore I do not claim such former devices broadly.

I claim as new and desire to secure by United States Letters Patent—

1. As an improved article of manufacture, the removable horseshoe-pad herein described, the same consisting of a pad member $a$ of rubber or other suitable elastic material arranged to conform to and fill the inner space of the shoe, a longitudinal slit formed in the rear or heel portion of the pad, a transversely-arranged guide or dowel-pin mounted in the adjacent parts of said slitted portion, and short projecting toe and heel clips rigidly secured to the upper side of the pad and capable of being inserted between the hoof and shoe.

2. The combination with a horseshoe rigidly secured to the hoof of a horse, of the attachable elastic pad $a$ conforming to and filling the inner part of the shoe and covering the frog, the pad being held in position by means of short toe and heel clips secured thereto and interposed between said shoe and hoof, a longitudinally-extending slit or cut formed in the heel portion of the pad, and a dowel-pin or guide member mounted in the pad adjacent the sides of the slit, all constructed and arranged whereby the pad is capable of being readily detached from or attached to the horse's hoof and shoe without removing the latter, substantially as described.

Signed at Providence, Rhode Island, this 2d day of December, 1903.

CHARLES A. ELLIS.

Witnesses:
  GEO. H. REMINGTON,
  CALVIN H. BROWN.